United States Patent
Batirbek (10) Patent No.: US 10,976,771 B1
(45) Date of Patent: Apr. 13, 2021

(54) MONITOR BORDER

(71) Applicant: Lale Batirbek, Clifton, NJ (US)

(72) Inventor: Lale Batirbek, Clifton, NJ (US)

( * ) Notice: Subject to any disclaimer, the term of this patent is extended or adjusted under 35 U.S.C. 154(b) by 0 days.

(21) Appl. No.: 16/688,220

(22) Filed: Nov. 19, 2019

(51) Int. Cl.
| | |
|---|---|
| *G06F 1/16* | (2006.01) |
| *F21V 8/00* | (2006.01) |
| *F21S 4/20* | (2016.01) |
| *F21V 33/00* | (2006.01) |

(52) U.S. Cl.
CPC ............ *G06F 1/1607* (2013.01); *F21S 4/20* (2016.01); *F21V 33/0052* (2013.01); *G02B 6/001* (2013.01)

(58) Field of Classification Search
CPC .......... G06F 1/1607; G02B 6/001; F21S 4/20; F21S 4/26; F21S 4/28
See application file for complete search history.

(56) References Cited

U.S. PATENT DOCUMENTS

| | | | | |
|---|---|---|---|---|
| 1,351,086 | A * | 8/1920 | Wright | A63H 33/044 446/106 |
| 3,098,611 | A * | 7/1963 | Connell | G09F 13/00 40/714 |
| 6,052,933 | A | 4/2000 | Lytle | |
| 6,594,144 | B1 * | 7/2003 | Miles | G06F 1/1607 248/441.1 |
| 7,808,563 | B2 | 10/2010 | Sanchez | |
| 8,134,651 | B1 | 3/2012 | Reid | |
| 8,375,648 | B1 | 2/2013 | O'Sulivan | |
| 8,839,540 | B2 * | 9/2014 | Gordon | H04N 1/00347 40/798 |
| 8,876,307 | B2 * | 11/2014 | Geddes | G03B 15/07 362/11 |
| D755,744 | S | 5/2016 | Williams | |
| 9,370,266 | B2 | 6/2016 | Best et al. | |
| 9,464,796 | B2 * | 10/2016 | Shoemake | F21V 23/04 |
| 9,593,842 | B2 * | 3/2017 | Shoemake | F21V 33/0052 |
| D806,690 | S | 1/2018 | Schimon | |
| 2001/0037593 | A1 * | 11/2001 | Korpai | G06F 1/1607 40/594 |
| 2004/0150943 | A1 * | 8/2004 | Rock | G06F 1/1607 361/679.22 |
| 2006/0000135 | A1 * | 1/2006 | Yoon | B44C 1/18 40/799 |
| 2006/0208619 | A1 | 9/2006 | McLin et al. | |
| 2007/0056201 | A1 | 3/2007 | Price et al. | |

OTHER PUBLICATIONS

Lincoln Log Box—PlaySkool—1986 [Date accessed Sep. 20, 2019].

* cited by examiner

*Primary Examiner* — William N Harris
(74) *Attorney, Agent, or Firm* — Michael J. Feigin, Esq.; Feigin and Fridman LLC (57) ABSTRACT

An ornamental monitor border device is disclosed. The device includes a substantially U-shaped frame, a track disposed on an interior side of the frame, and a plurality of protruding members disposed on an exterior side of the frame. The track includes a receptacle adapted to slidably engage an edge of a monitor thereby enabling a user to mount the U-shaped frame onto the monitor. The plurality of protruding members include light sources or decorative members that extend outwardly from the frame. The frame includes electrical wiring that is operably coupled to the plurality of protruding members and an electrical connector for connection to an electrical socket and providing power to the plurality of protruding members.

15 Claims, 13 Drawing Sheets

MONITOR BORDER

FIELD OF THE DISCLOSED TECHNOLOGY

The disclosed technology relates to an ornamental monitor border device. More specifically, the disclosed technology relates to an ornamental device for a monitor, such as television or a computer screen, that includes various ornamental features and a frame that is slidably engageable with the edges of the monitor.

BACKGROUND OF THE DISCLOSED TECHNOLOGY

Monitors can be quite dull in terms of their appearance and ornamentation. Indeed, most monitors include frames that are completely devoid of any sort of design, ornamentation, or decoration leaving them in need of some form of enhancement. However, users may want to decorate their monitors, such as their televisions or computer screens, to enhance the overall décor of their home or room.

Moreover, when monitors are powered off, they provide no light to the areas of a room that they would otherwise be providing light. Indeed, the only way to provide light to those areas is to turn on the monitor such that the display screen of the monitor provides the light, or to turn on a regular household light fixture. However, light from household light fixtures and from display screens can be irritating as they may be too intense. Therefore, it is desirable to have a light source that attachable to a monitor, such that the monitor can emanate less intense and/or more natural light when the monitor is powered off.

Accordingly, there is a need for an ornamental monitor border device that is slidably engageable with the edges of a monitor to enable a user to decorate the monitor without obstructing its view and that includes a means for providing light when the monitor is turned off.

SUMMARY OF THE DISCLOSED TECHNOLOGY

Disclosed herein is an ornamental monitor border device including a substantially U-shaped frame including a first end, a second end, an exterior side, and an interior side, the exterior side opposite the interior side, a track disposed on the interior side of the frame, the track including a first side wall and a second side wall defining a receptacle therebetween that extends longitudinally from the first end of the frame to the second end of the frame, and a plurality of protruding members disposed on the exterior side of the frame, the plurality of protruding members extending outwardly relative to the exterior side of the frame, wherein the receptacle is adapted to slidably engage an edge of a monitor.

In embodiments, the first side wall and the second side wall angle inwardly towards each other forming acute angles relative to a surface of the track, such that the first side wall and the second side wall are frictionally engageable with the edge of the monitor on which the receptacle is slidably mounted by exerting an inward force on the edge.

In some embodiments, the first side wall and the second side wall are perpendicular relative to a surface of the track such that the first side wall and the second side wall are parallel relative to each other. The first side wall and the second side wall define a rectangular receptacle including a width that is substantially equal to the width of the edges of the monitor, such that the first side wall and the second side wall are frictionally engageable with the edge of the monitor on which the receptacle is slidably mounted.

In embodiments, the frame includes a cross member, a first side member, and a second side member. The first side member extends perpendicularly outwardly from a first end of the cross member and the second side member extends perpendicularly outwardly from a second end of the cross member, such that the first side member and the second side member parallel relative to each other. The first side member includes a proximal end attached to the first end of the cross member and a distal end defining the first end of the frame. The second side member includes a proximal end attached to the second end of the cross member and a distal end defining the second end of the frame. In one embodiment, the first side member is removably attachable to the first end of the cross member and the second side member is removably attachable to the second end of the cross member.

In some embodiments, the plurality of protruding members are aligned and spaced evenly with respect to each other along the exterior surface of the frame. In one embodiment, the plurality of protruding members include light sources.

In certain embodiments, the frame includes an electrical wiring disposed in the exterior surface. The electrical wiring is operably coupled to the plurality of protruding members and includes an electrical connector disposed at an end thereof for connection to an electrical socket and providing power to the plurality of protruding members. In one embodiment, the electrical wiring is a side-emitting optical fiber and the frame includes a transparent material to enable light emanating from the side-emitting optical fiber to emanate therethrough.

In embodiments, the device includes a housing protruding outwardly from an end of the frame, the housing including a receptacle to receive a power source. In some embodiments, the device includes a power source disposed within the housing, the power source including one or more electrical ports for receiving the electrical connector or other electrical inputs and providing power thereto.

Also, disclosed herein is a method of attaching an ornamental device to a monitor including mounting a first length of material on a first side edge of a monitor, mounting a second length of material on a second side edge of the monitor, mounting a third length of material on a third side edge of the monitor, and connecting the first length of material, the second length of material, and the third length of material to one another in order to form a U-shaped frame around the monitor.

In embodiments, the method includes mounting a fourth length of material on a fourth side edge of the monitor, wherein the fourth length of material is connected to the U-shaped frame to form a border around all the edges of the monitor.

In some embodiments, the first length of material includes a length that is substantially equal to the length of the first side edge of the monitor, the second length of material includes a length that is substantially equal to the length of the second side edge of the monitor, the third length of material includes a length that is substantially equal to the length of the third side edge of the monitor, and the fourth length of material includes a length that is substantially equal to the length of the fourth side edge of the monitor.

In certain embodiments, the method includes cutting the first length of material from an elongated length of material, cutting the second length of material from the elongated length of material, cutting the third length of material from the elongated length of material, and cutting the fourth length of material from the elongated length of material.

In embodiments, the length of material includes a first end, a second end, an exterior side, and an interior side, the exterior side opposite the interior side, a track disposed on the interior side of the frame, and a plurality of protruding members disposed on the exterior side of the frame. The track includes a first side wall and a second side wall defining a receptacle therebetween that extends longitudinally from the first end of the track to the second end of the track. The plurality of protruding members extend outwardly from the frame. The receptacle is adapted to slidably receive the edges of the monitor.

In some embodiments, the first side wall and the second side wall angle inwardly towards each other forming acute angles relative to a surface of the track, such that the first side wall and the second side wall are frictionally engageable with the edge of the monitor on which the receptacle is slidably mounted by exerting an inward force on the edge.

In other embodiments, the first side wall and the second side wall are perpendicular relative to a surface of the track such that the first side wall and the second side wall are parallel relative to each other. The first side wall and the second side wall define a rectangular receptacle including a width that is substantially equal to the width of the edges of the monitor, such that the first side wall and the second side wall are frictionally engageable with the edge of the monitor on which the receptacle is slidably mounted.

In one embodiment, the method includes a side-emitting optical fiber disposed in the exterior surface of the frame. The side-emitting optical fiber is operably coupled to the plurality of protruding members and includes an electrical connector disposed at an end thereof for connection to an electrical socket and providing power to the plurality of protruding members. The frame and the plurality of protruding members comprise a transparent material to enable light emanating from the side-emitting optical fiber to emanate therethrough.

For purposes of this disclosure, the following definitions are used. "Track" is defined as "a receptacle that provides a path on which another object slides along an axis of movement." "Receptacle" is defined "as an object or space used to contain something." "Monitor" is defined as "a screen which displays an image generated by a computer or hardware, such as a computer screen, television screen, liquid crystal display (LCD) screen, and visual display unit." "Engage" is defined as "to fit into or receive each other, or to make contact to lock one with another." "Acute angle" is defined as "an angle whose measure is between 0 degrees and 90 degrees." "Side-emitting optical fiber" refers to "a long thin strand of material, i.e., plastic or silica, consisting of a transparent inner core and an external coating called a cladding." "Cladding" is defined as "one or more layers of materials of lower refractive index, in intimate contact with a core material of higher refractive index." A "side-emitting optical fiber" is different than an "end-emitting optical fiber" because the cladding of a "side-emitting optical fiber" is intentionally less effective, i.e., the interface between the cladding and the core layer is rougher, such that light gradually escapes along the whole length of the fiber creating a fairly even glow throughout the fiber.

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

DETAILED DESCRIPTION OF EMBODIMENTS OF THE DISCLOSED TECHNOLOGY

The present disclosed technology provides an ornamental monitor border device and a method of attaching the same. The ornamental monitor border device includes a substantially U-shaped frame including a first end, a second end, an exterior side, and an interior side, a track disposed on the interior side of the frame, the track including a first side wall and a second side wall defining a receptacle therebetween that extends longitudinally from the first end of the frame to the second end of the frame, and a plurality of protruding members disposed on the exterior side of the frame, the plurality of protruding members extending outwardly relative to the exterior side of the frame. The receptacle is adapted to slidably engage an edge of a monitor enabling a user to mount the U-shaped frame onto the monitor. The method includes mounting a first length of material on a first side edge of a monitor, mounting a second length of material on a second side edge of the monitor, mounting a third length of material on a third side edge of the monitor, and connecting the first length of material, the second length of material, and the third length of material to one another in order to form a U-shaped frame around the monitor.

Figure 1:
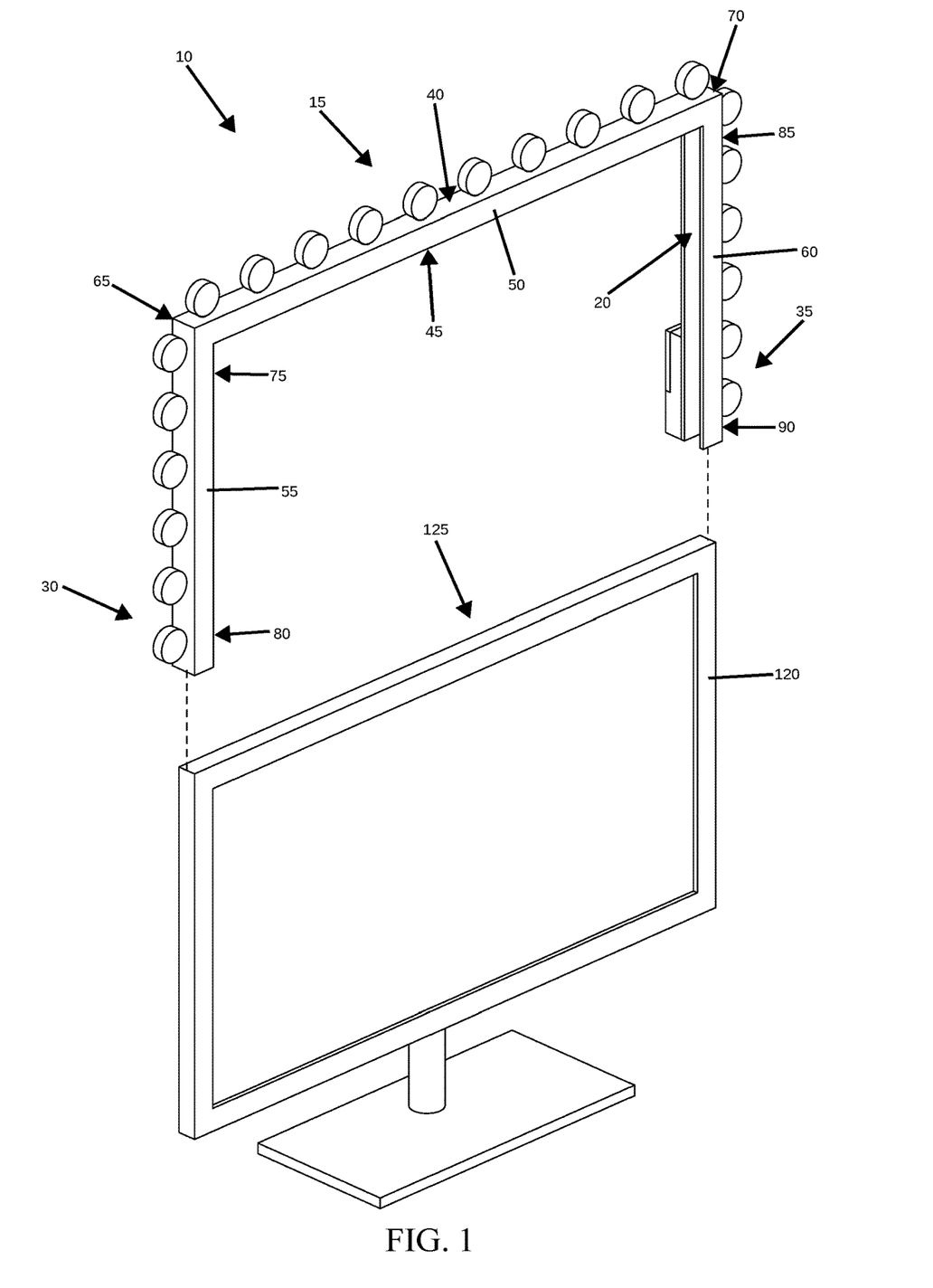
FIG. 1 shows an exploded view of the ornamental monitor border device being mounted onto a monitor according to one embodiment of the present disclosed technology.
Figure 2:
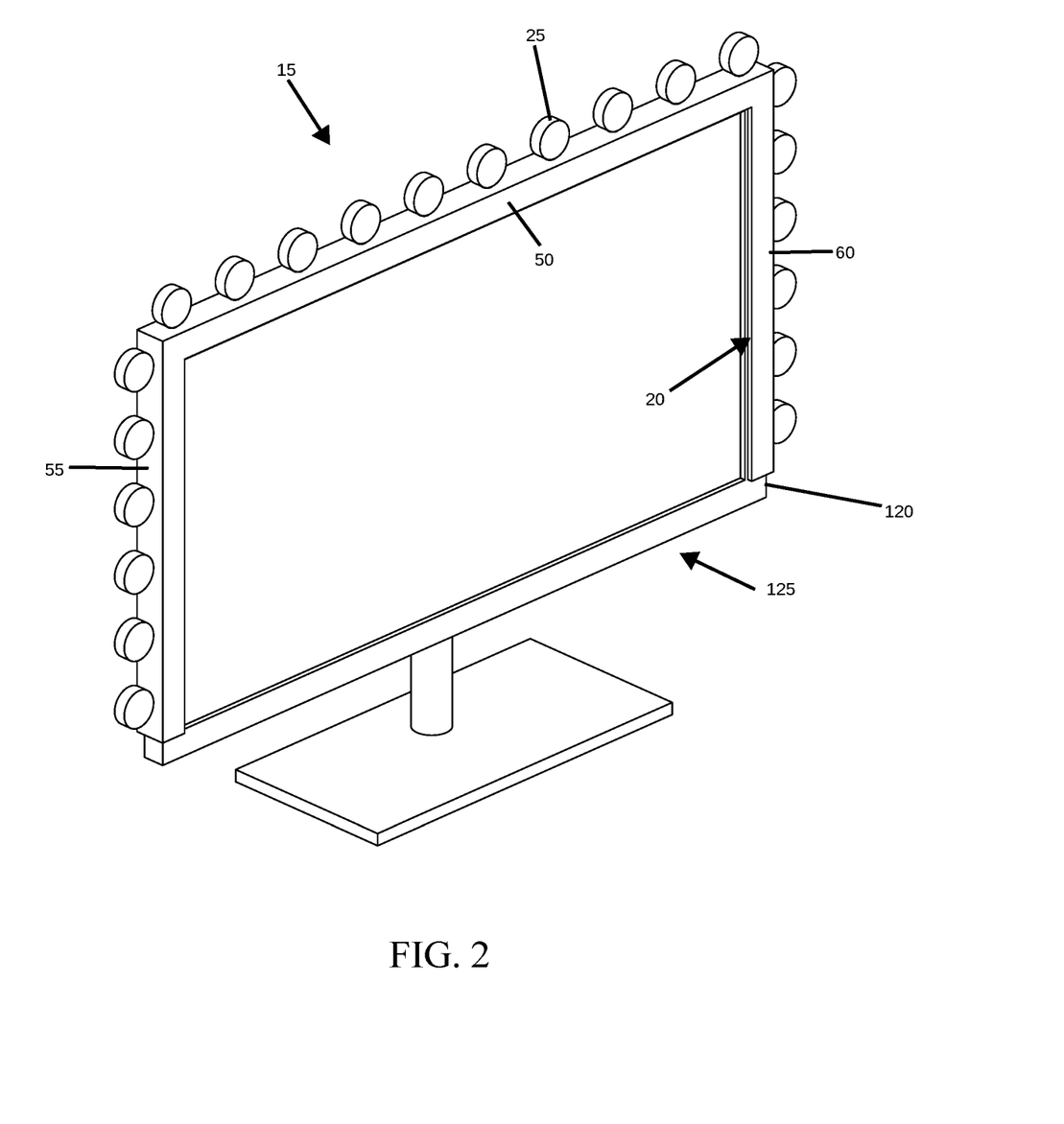
FIG. 2 shows a perspective front view of the ornamental monitor device mounted onto a monitor according to one embodiment of the present disclosed technology.
Figure 3:
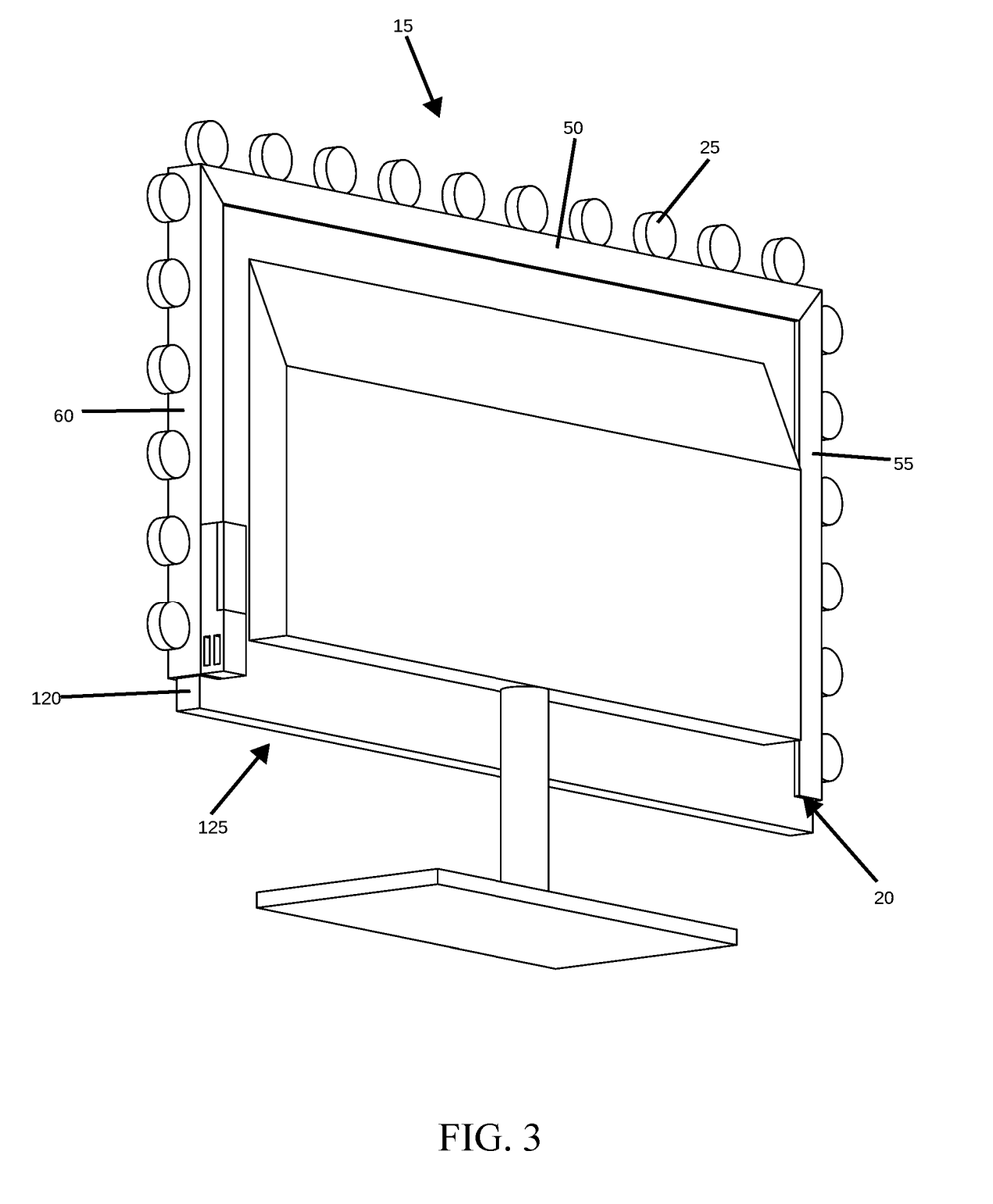
FIG. 3 shows a perspective rear view of the ornamental monitor device mounted onto a monitor according to one embodiment of the present disclosed technology.
Figure 4:
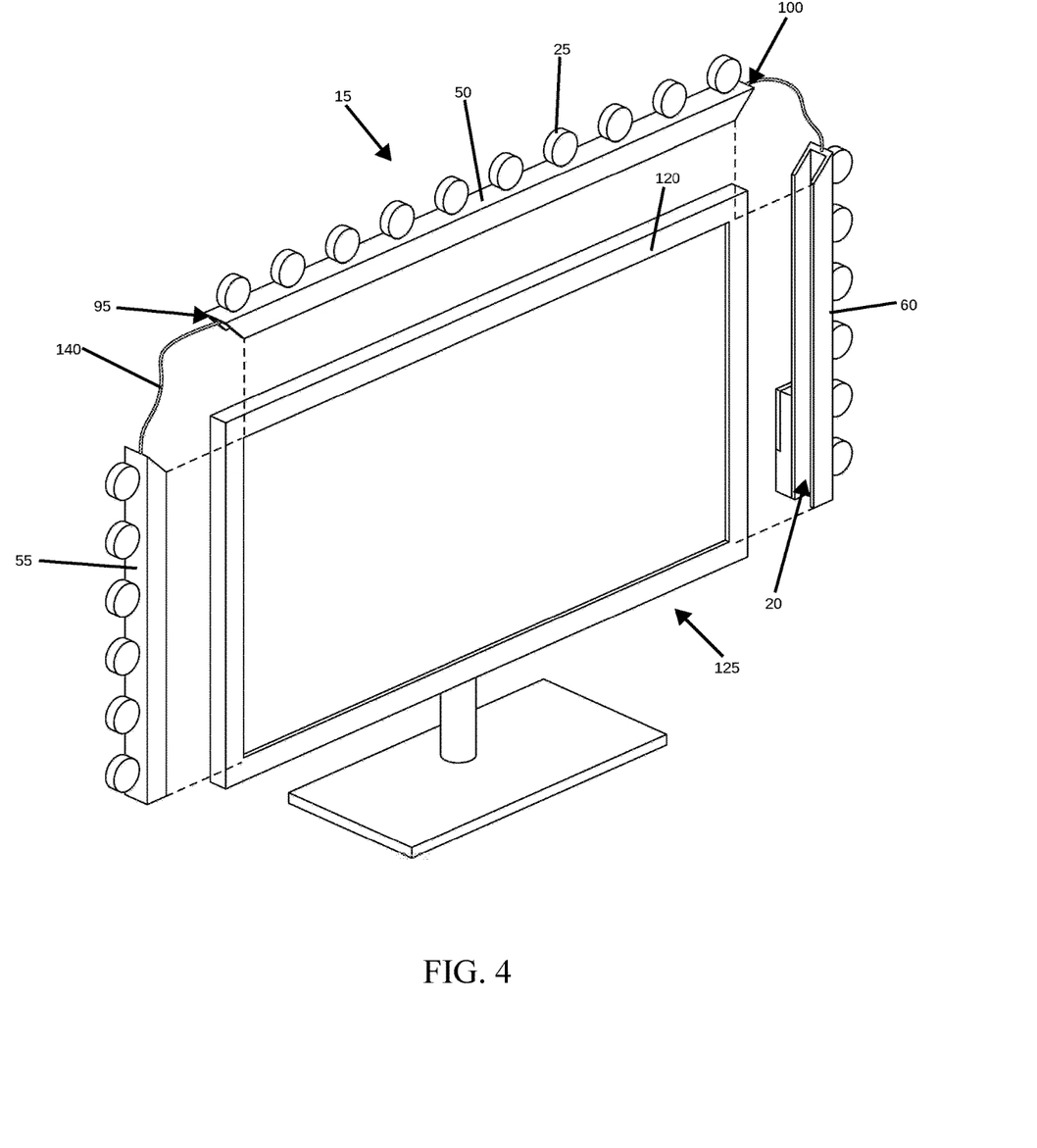
FIG. 4 shows an exploded view of the ornamental monitor border device being mounted onto a monitor according to another embodiment of the present disclosed technology.
Figure 5:
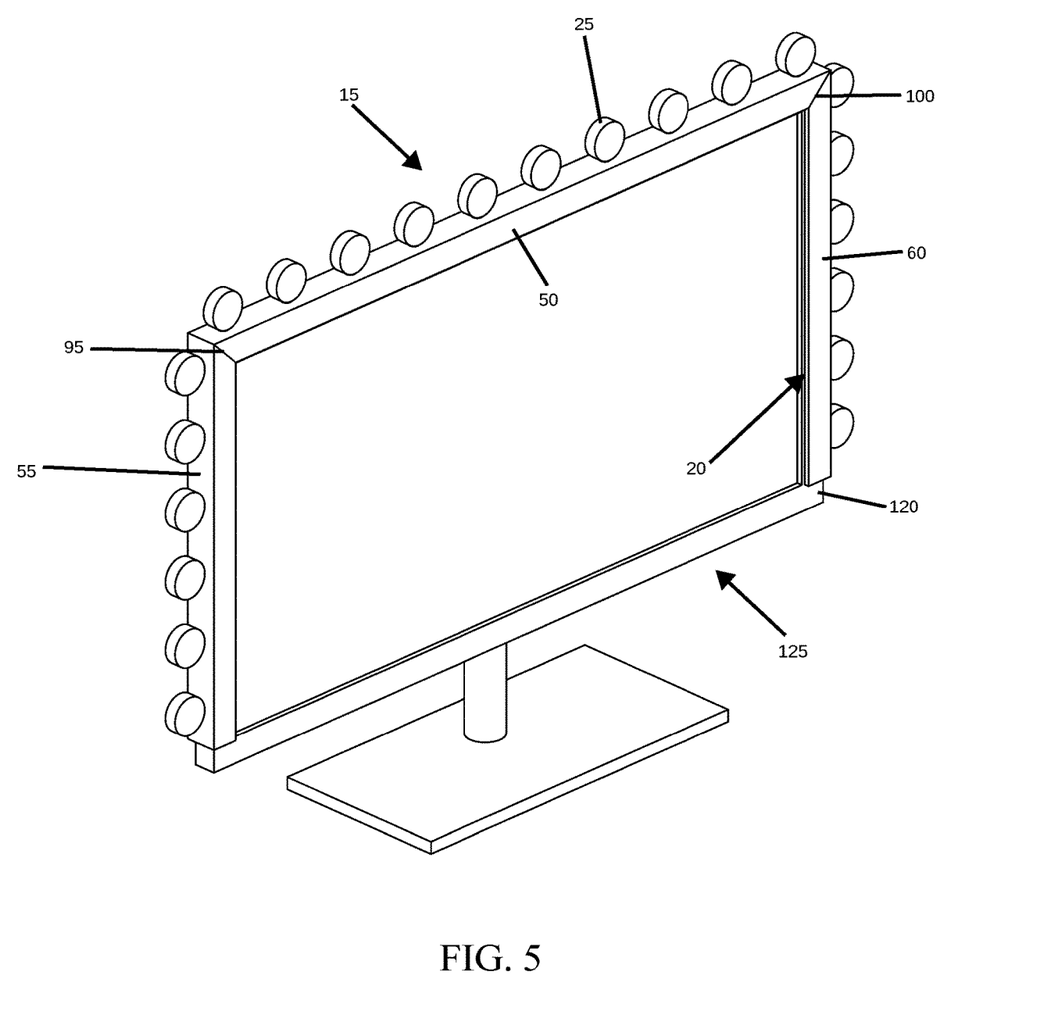
FIG. 5 shows a perspective view of the ornamental monitor border device mounted onto a monitor according to another embodiment of the present disclosed technology.
Figure 6:
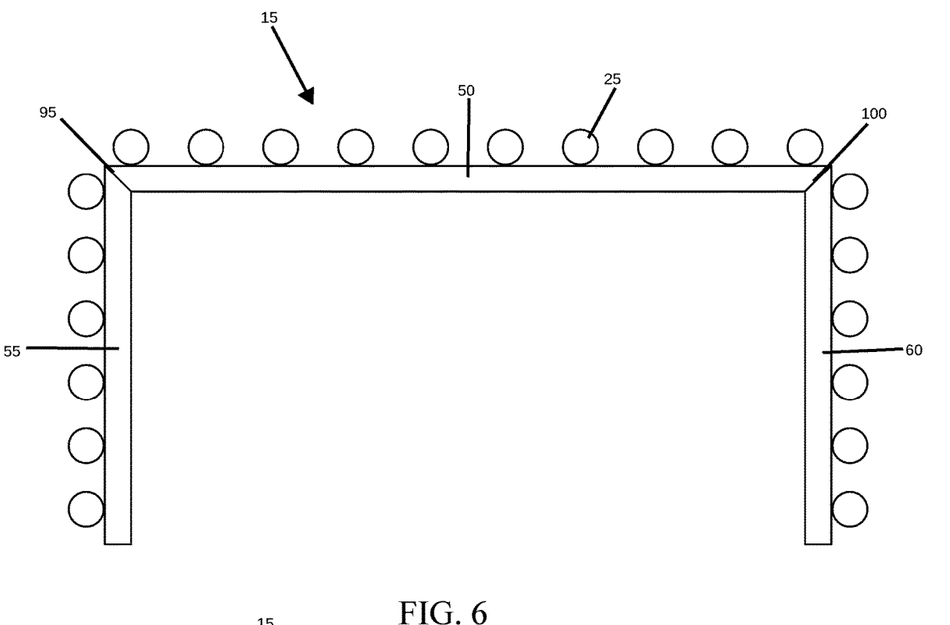
FIG. 6 shows a front view of the ornamental monitor border according to one embodiment of the present disclosed technology.
Figure 7:
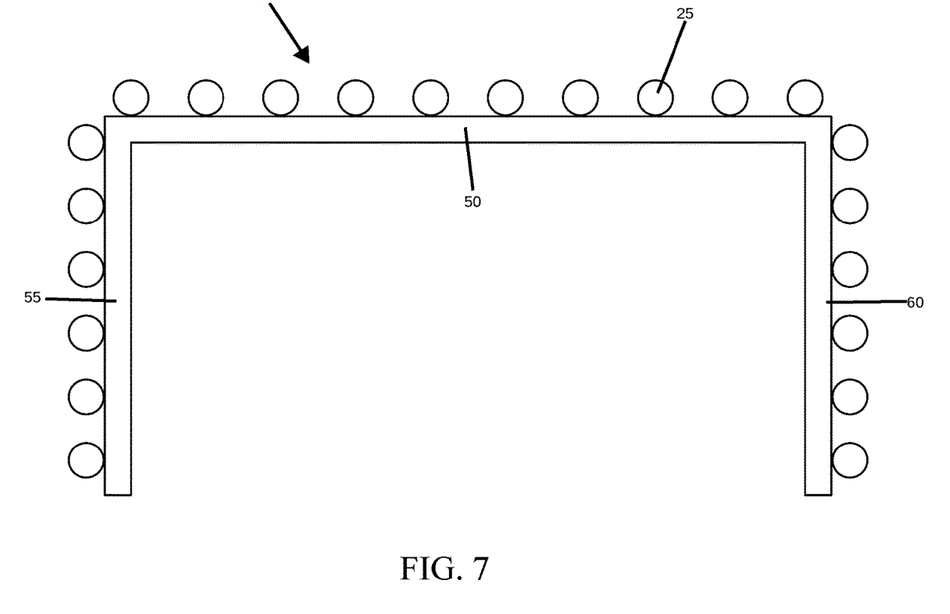
FIG. 7 shows a front view of the ornamental monitor border according to another embodiment of the present disclosed technology.
Figure 8A:
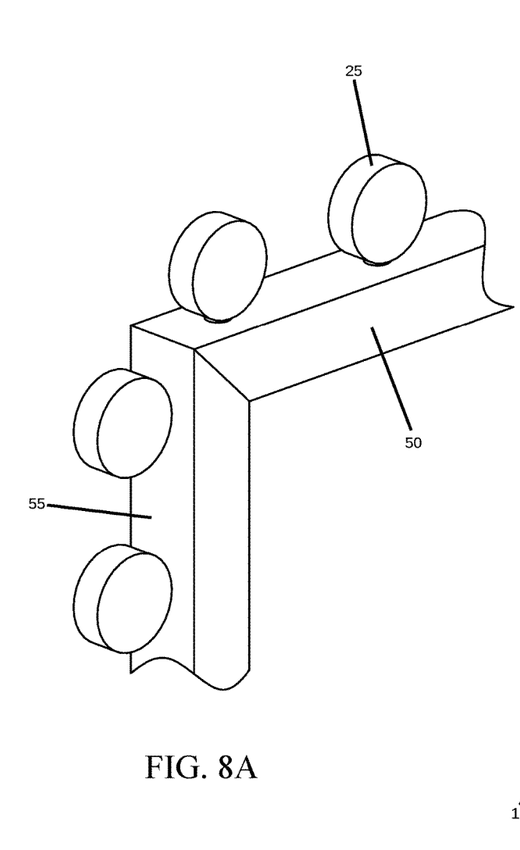
FIG. 8A shows a perspective top view of a portion of the exterior surface of the ornamental monitor border according to one embodiment of the present disclosed technology.
Figure 8B:
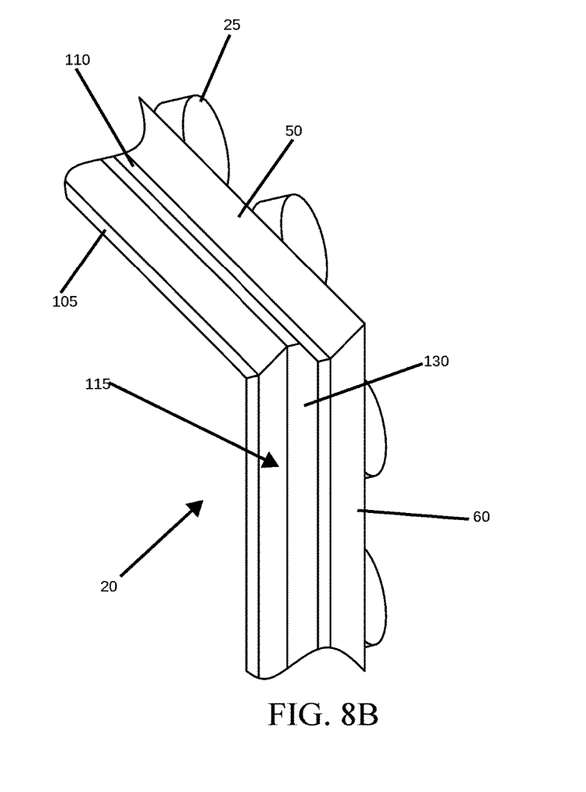
FIG. 8B shows a perspective bottom view of portion of the track of the ornamental monitor border according to one embodiment of the present disclosed technology.
Figure 9:
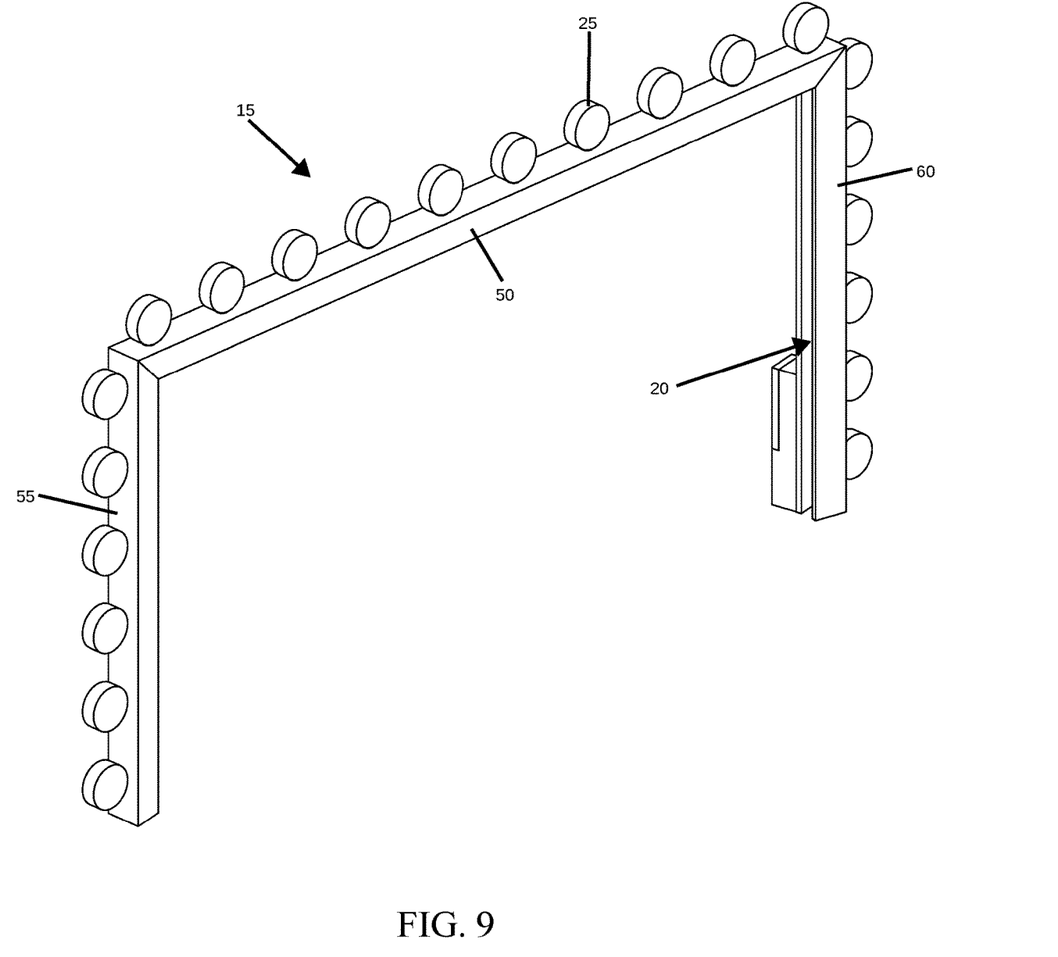
FIG. 9 shows a perspective front view of the ornamental monitor border according to a second embodiment of the present disclosed technology.
Figure 10:
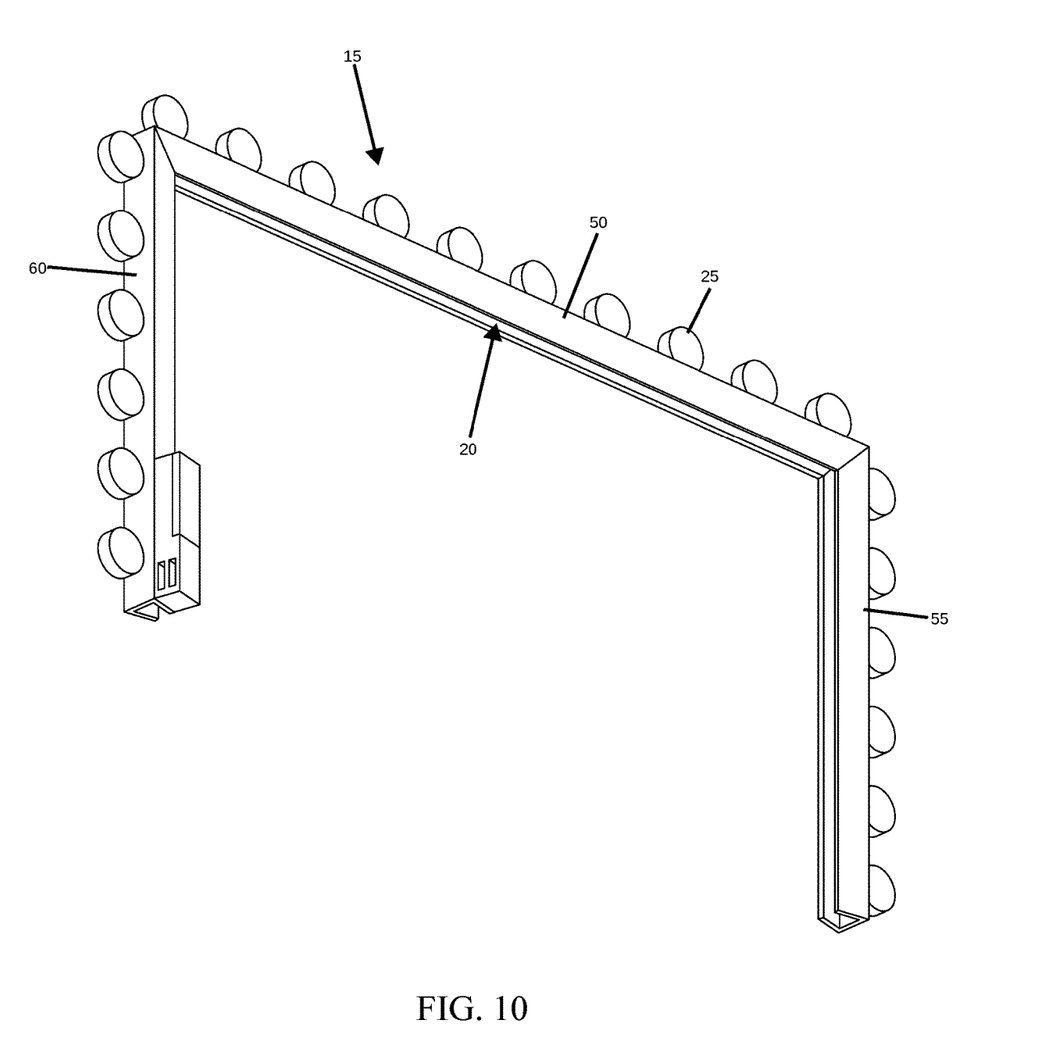
FIG. 10 shows a perspective rear view of the ornamental monitor border according to the second embodiment of the present disclosed technology.
Figure 11A:
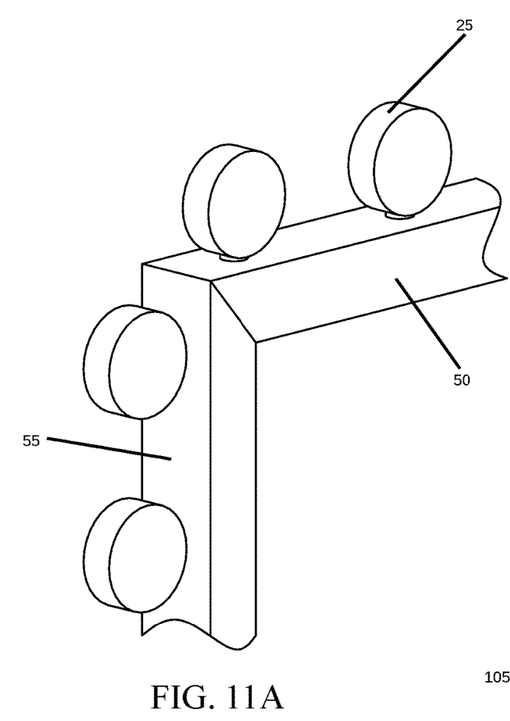
FIG. 11A shows a perspective top view of a portion of the exterior surface of the ornamental monitor border according to the second embodiment of the present disclosed technology.
Figure 11B:
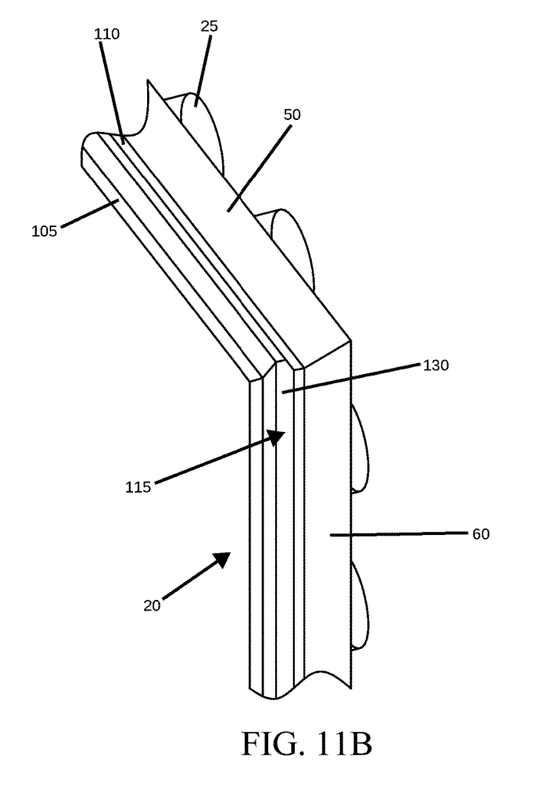
FIG. 11B shows a perspective bottom view of portion of the track of the ornamental monitor border according to the second embodiment of the present disclosed technology.
Figure 12:
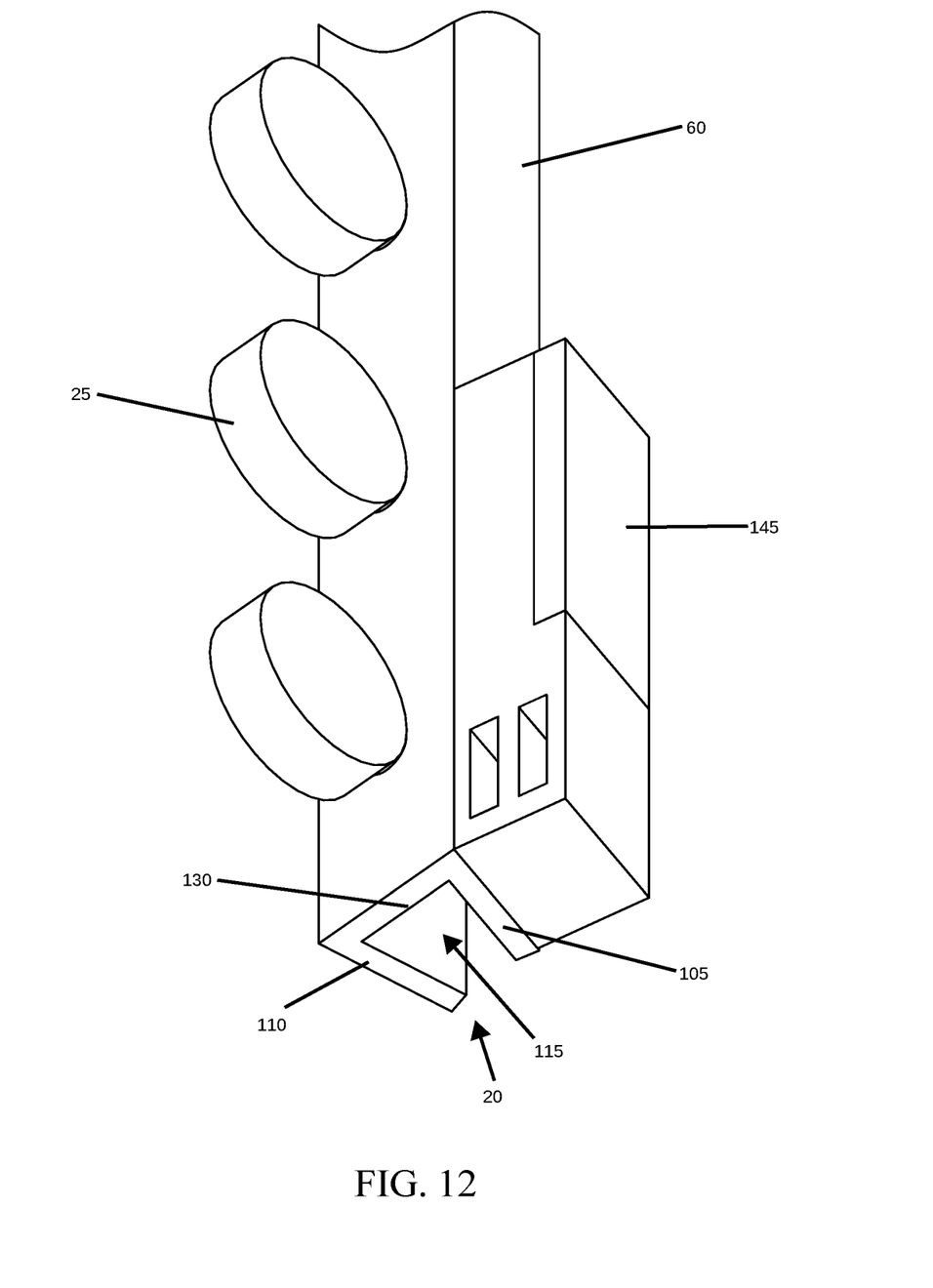
FIG. 12 shows a close-up view of an end of the frame of the ornamental monitor border according to the second embodiment of the present disclosed technology.
Figure 13:
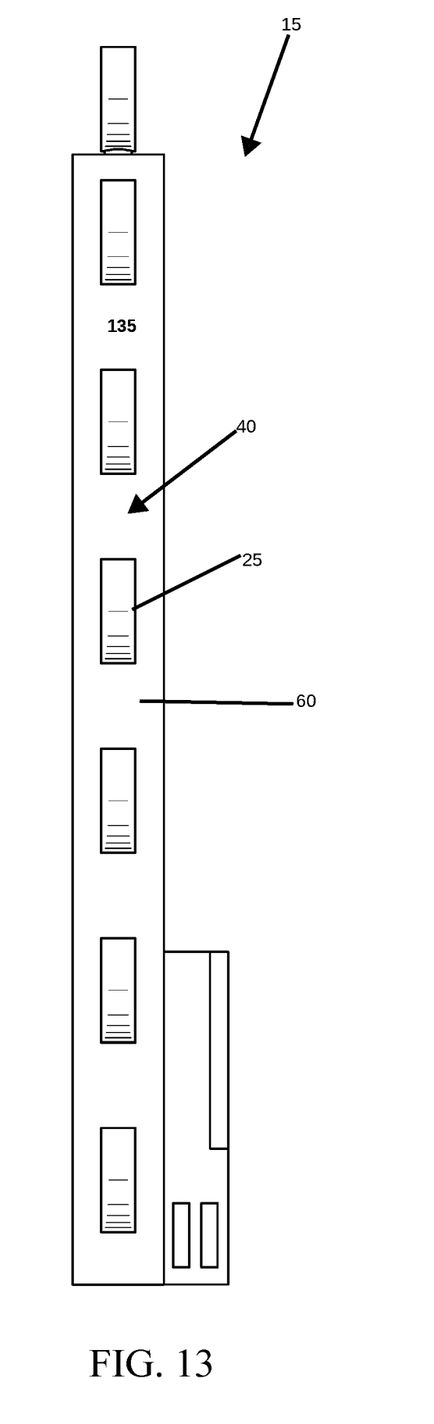
FIG. 13 shows a side view of the ornamental monitor border according to one embodiment of the present disclosed technology.
Figure 14:
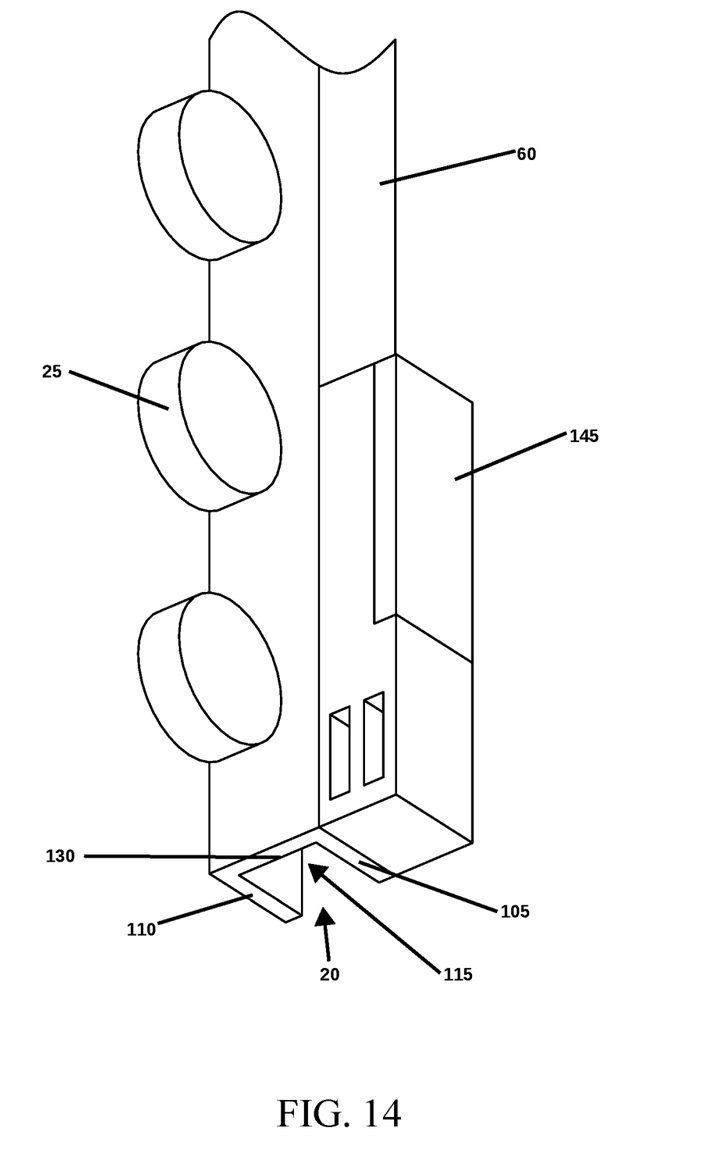
FIG. 14 shows a close-up view of the housing of the frame of the ornamental monitor border according to one embodiment of the present disclosed technology.

Referring now to FIGS. 1-14, simultaneously, FIG. 1 shows an exploded view of the ornamental monitor border device being mounted onto a monitor according to one embodiment of the present disclosed technology. FIG. 2 shows a perspective front view of the ornamental monitor device mounted onto a monitor according to one embodiment of the present disclosed technology. FIG. 3 shows a perspective rear view of the ornamental monitor device mounted onto a monitor according to one embodiment of the present disclosed technology. FIG. 4 shows an exploded view of the ornamental monitor border device being mounted onto a monitor according to another embodiment of the present disclosed technology. FIG. 5 shows a perspective view of the ornamental monitor border device mounted onto a monitor according to another embodiment of the present disclosed technology. FIG. 6 shows a front view of the ornamental monitor border according to one embodiment of the present disclosed technology. FIG. 7 shows a front view of the ornamental monitor border according to another embodiment of the present disclosed technology. FIG. 8A shows a perspective top view of a portion of the exterior surface of the ornamental monitor border according to one embodiment of the present disclosed technology. FIG. 8B shows a perspective bottom view of portion of the track of the ornamental monitor border according to one embodiment of the present disclosed technology. FIG. 9 shows a perspective front view of the ornamental monitor border according to a second embodiment of the present disclosed technology. FIG. 10 shows a perspective rear view of the ornamental monitor border according to the second embodiment of the present disclosed technology. FIG. 11A shows a perspective top view of a portion of the exterior surface of the ornamental monitor border according to the second embodiment of the present disclosed technology. FIG. 11B shows a perspective bottom view of portion of the track of the ornamental monitor border according to the second embodiment of the present disclosed technology. FIG. 12 shows a close-up view of an end of the frame of the ornamental monitor border according to the second embodiment of the present disclosed technology. FIG. 13 shows a side view of the ornamental monitor border according to one embodiment of the present disclosed technology. FIG. 14 shows a close-up view of the housing of the frame of the ornamental monitor border according to one embodiment of the present disclosed technology.

The present disclosed technology comprises an ornamental monitor border device 10 including a substantially U-shaped frame 15, a track 20, and a plurality of protruding members 25. The substantially U-shaped frame 15 includes a first end 30, a second end 35, an exterior side 40, and an interior side 45. The exterior side 40 is opposite the interior side 45.

In embodiments, the frame 15 includes a cross member 50, a first side member 55, and a second side member 60. The first side member 55 extends perpendicularly outwardly from a first end 65 of the cross member 50 and the second side member 60 extends perpendicularly outwardly from a second end 70 of the cross member 50, such that the first side member and the second side member parallel relative to each other. The first side member 55 includes a proximal end 75 attached to the first end 65 of the cross member 50 and a distal end 80 defining the first end 30 of the frame 15. The second side member 60 includes a proximal end 85 attached to the second end 70 of the cross member 50 and a distal end 90 defining the second end 35 of the frame 15. In one embodiment, the first side member 55 is removably attachable to the first end 65 of the cross member 50 at a first line of connection 95 and the second side member 60 is removably attachable to the second end 70 of the cross member 50 at a second line of connection 100, as shown in FIGS. 4-6.

In embodiments, the track 20 is disposed on the interior side 45 of the frame 15 and includes a first side wall 105 and a second side wall 110 defining a receptacle 115 therebetween that extends longitudinally from the first end 30 of the frame 15 to the second end 35 of the frame 15, as shown in FIGS. 8B and 13. The receptacle 115 is adapted to slidably engage an edge 120 of a monitor 125, as shown in FIG. 1.

In some embodiments, the first side wall 105 and the second side wall 110 are perpendicular relative to a surface 130 of the track 20 such that the first side wall 105 and the second side wall 110 are parallel relative to each other, as shown by FIGS. 8B and 13. The first side wall 105 and the second side wall 110 define a rectangularly shaped receptacle including a width that is substantially equal to the width of the edge 120 of the monitor 125, such that the first side wall 105 and the second side wall 110 are frictionally engageable with the edge 120 of the monitor 125 on which the receptacle 115 is slidably mounted.

In embodiments, the first side wall 105 and the second side wall 110 angle inwardly towards each other forming acute angles relative to the surface 130 of the track 20, such that the first side wall 105 and the second side wall 110 are frictionally engageable with the edge 120 of the monitor 125 on which the receptacle is slidably mounted by exerting an inward force on the edge 120, as shown by FIGS. 9-12.

In embodiments, the plurality of protruding members 25 are disposed on the exterior side 40 of the frame 15. The plurality of protruding members 25 extend outwardly relative to the exterior side 40 of the frame 15. In one embodiment, the plurality of protruding members 25 extend perpendicularly outwardly relative to the exterior side 40 of the frame 15. In some embodiments, the plurality of protruding members 25 are aligned and spaced evenly with respect to each other along an exterior surface 135 of the frame 15, as shown in FIG. 13. In one embodiment, the plurality of protruding members 25 include light sources. In other embodiments, the plurality of protruding members 25 comprise light bulbs, lasers, or decorative members consisting of ornaments, characters, or the like.

In embodiments, the frame 15 includes electrical wiring 140 disposed in the exterior surface 135 of the frame, as shown in FIG. 4. The electrical wiring 140 is operably coupled to the plurality of protruding members 25 and includes an electrical connector disposed at an end of the electrical wiring 140 for connection to an electrical socket and providing power to the plurality of protruding members 25. In one embodiment, the electrical wiring 140 is a side-emitting optical fiber. In embodiments, the frame 15 comprises a transparent material to enable light emanating from the side-emitting optical fiber to emanate therethrough.

In embodiments, the ornamental border device 10 includes a housing 145 protruding outwardly from an end of the frame 15, as shown in FIGS. 12 and 14. The housing 145 includes a receptacle (not shown) adapted to receive a power source. In some embodiments, the ornamental border device 10 includes a power source disposed within the housing 145. The power source includes one or more electrical ports for receiving the electrical connector or other electrical inputs and providing power thereto.

The present disclosed technology also provides a method of attaching the ornamental border device to a monitor. The method includes mounting a first length of material on a first side edge of a monitor, mounting a second length of material on a second side edge of the monitor, mounting a third length of material on a third side edge of the monitor, and connecting the first length of material, the second length of material, and the third length of material to one another in order to form a U-shaped frame around the monitor. In one embodiment, the method includes mounting a fourth length of material on a fourth side edge of the monitor, wherein the fourth length of material is connected to the U-shaped frame to form a border around all the edges of the monitor. In embodiments, the first, second, third, and fourth lengths of material comprises a transparent plastic material. In other embodiments, the first, second, third, and fourth lengths of material comprises a wood or opaque plastic material.

In some embodiments, the first length of material includes a length that is substantially equal to the length of the first side edge of the monitor, the second length of material includes a length that is substantially equal to the length of the second side edge of the monitor, the third length of material includes a length that is substantially equal to the length of the third side edge of the monitor, and the fourth length of material includes a length that is substantially equal to the length of the fourth side edge of the monitor.

In certain embodiments, the method includes cutting the first length of material from an elongated length of material, cutting the second length of material from the elongated length of material, cutting the third length of material from the elongated length of material, and cutting the fourth length of material from the elongated length of material. In some embodiment, the elongated length of material comprises a plastic transparent material. In other embodiments, the elongated length of material comprises a wood or opaque plastic material. In one embodiment, the elongated length of material comprises a perforated line dividing the first, second, third, and fourth lengths of material so as to indicate where to cut or separate the lengths of material from one another.

In embodiments, the length of material includes a first end, a second end, an exterior side, and an interior side, the exterior side opposite the interior side, a track disposed on the interior side of the frame, and a plurality of protruding members disposed on the exterior side of the frame. The track includes a first side wall and a second side wall defining a receptacle therebetween that extends longitudinally from the first end of the track to the second end of the track. The plurality of protruding members extend outwardly from the frame. The receptacle is adapted to slidably receive the edges of the monitor.

In some embodiments, the first side wall and the second side wall angle inwardly towards each other forming acute angles relative to a surface of the track, such that the first side wall and the second side wall are frictionally engageable with the edge of the monitor on which the receptacle is slidably mounted by exerting an inward force on the edge.

In other embodiments, the first side wall and the second side wall are perpendicular relative to a surface of the track such that the first side wall and the second side wall are parallel relative to each other. The first side wall and the second side wall define a rectangular receptacle including a width that is substantially equal to the width of the edges of the monitor, such that the first side wall and the second side wall are frictionally engageable with the edge of the monitor on which the receptacle is slidably mounted.

In one embodiment, the method includes a side-emitting optical fiber disposed in the exterior surface of the frame. The side-emitting optical fiber is operably coupled to the plurality of protruding members and includes an electrical connector disposed at an end thereof for connection to an electrical socket and providing power to the plurality of protruding members. The frame and the plurality of protruding members comprise a transparent material to enable light emanating from the side-emitting optical fiber to emanate therethrough.

The present technology can be carried out with one or more of the embodiments described. The drawings show embodiments with the understanding that the present description is to be considered an exemplification of the principles and is not intended to be exhaustive or to limit the disclosure to the details of construction. The arrangements of the components are set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. An ornamental monitor border device, comprising:
    a substantially U-shaped frame including a first end, a second end, an exterior side, and an interior side, the exterior side opposite the interior side;
    a track disposed on the interior side of the frame, the track including a first side wall and a second side wall defining a receptacle therebetween that extends longitudinally from the first end of the frame to the second end of the frame; and
    a plurality of protruding members disposed on the exterior side of the frame, the plurality of protruding members extending outwardly relative to the exterior side of the frame;
    wherein the receptacle is adapted to slidably engage an edge of a monitor.

2. The device of claim 1, wherein the first side wall and the second side wall angle inwardly towards each other forming acute angles relative to a surface of the track, such that the first side wall and the second side wall are frictionally engageable with the edge of the monitor on which the receptacle is slidably mounted by exerting an inward force on the edge.

3. The device of claim 1, wherein the first side wall and the second side wall are perpendicular relative to a surface of the track such that the first side wall and the second side wall are parallel relative to each other, the first side wall and the second side wall defining a rectangular receptacle including a width that is substantially equal to a width of the edges of the monitor, such that the first side wall and the second side wall are frictionally engageable with the edge of the monitor on which the receptacle is slidably mounted.

4. The device of claim 1, wherein:
the frame includes a cross member, a first side member, and a second side member, the first side member extending perpendicularly outwardly from a first end of the cross member, the second side member extending perpendicularly outwardly from a second end of the cross member, the first side member and the second side member parallel relative to each other;
the first side member including a proximal end attached to the first end of the cross member and a distal end defining the first end of the frame; and
the second side member including a proximal end attached to the second end of the cross member and a distal end defining the second end of the frame.

5. The device of claim 4, wherein the first side member is removably attachable to the first end of the cross member and the second side member is removably attachable to the second end of the cross member.

6. The device of claim 1, wherein the plurality of protruding members are aligned and spaced evenly with respect to each other along an exterior surface of the frame.

7. The device of claim 6, wherein the plurality of protruding members include light sources.

8. The device of claim 7, wherein the frame includes an electrical wiring disposed in the exterior surface, the electrical wiring operably coupled to the plurality of protruding members and including an electrical connector disposed at an end thereof for connection to an electrical socket and providing power to the plurality of protruding members.

9. The device of claim 8, wherein:
the electrical wiring is a side-emitting optical fiber; and
the frame comprises a transparent material to enable light emanating from the side-emitting optical fiber to emanate therethrough.

10. The device of claim 8, further comprising a housing protruding outwardly from an end of the frame, the housing including a receptacle to receive a power source.

11. The device of claim 10, further comprising a power source disposed within the housing, the power source including one or more electrical ports for receiving the electrical connector or other electrical inputs and providing power thereto.

12. A method of attaching an ornamental device to a monitor, comprising the steps of:
mounting a first length of material on a first side edge of a monitor;
mounting a second length of material on a second side edge of the monitor;
mounting a third length of material on a third side edge of the monitor; and
connecting the first length of material, the second length of material, and the third length of material to one another in order to form a U-shaped frame around the monitor;
slidably engaging the first length of material with the first side edge of the monitor;
slidably engaging the second length of material with the second side edge of the monitor;
slidably engaging the third length of material with the third side edge of the monitor;
cutting the first length of material from an elongated length of material;
cutting the second length of material from the elongated length of material;
cutting the third length of material from the elongated length of material;
wherein the length of material comprises a first end, a second end, an exterior side, and an interior side, the exterior side opposite the interior side;
wherein the track includes a first side wall and a second side wall defining a receptacle therebetween that extends longitudinally from the first end of the track to the second end of the track;
wherein a plurality of protruding members are disposed on the exterior side of the frame, the plurality of protruding members extending outwardly from the frame;
wherein the receptacle is adapted to slidably engage an edge of the monitor;
wherein a track disposed on an interior side of each of said first, second, and third length of material is joined into a single continuous track with two right angled bends;
wherein the first length of material includes a length that is substantially equal to a length of the first side edge of the monitor;
wherein the second length of material includes a length that is substantially equal to the length of a second side edge of the monitor; and wherein
the third length of material includes a length that is substantially equal to a length of the third side edge of the monitor.

13. The method of claim 12, wherein the first side wall and the second side wall angle inwardly towards each other forming acute angles relative to a surface of the track, such that the first side wall and the second side wall are frictionally engageable with the edge of the monitor on which the receptacle is slidably mounted by exerting an inward force on the edge.

14. The method of claim 12, wherein the first side wall and the second side wall are perpendicular relative to a surface of the track such that the first side wall and the second side wall are parallel relative to each other, the first side wall and the second side wall defining a rectangular receptacle including a width that is substantially equal to the width of the edges of the monitor, such that the first side wall and the second side wall are frictionally engageable with the edge of the monitor on which the receptacle is slidably mounted.

15. The method of claim 12, further comprising:
a side-emitting optical fiber disposed in an exterior surface of the frame, the side-emitting optical fiber operably coupled to the plurality of protruding members and including an electrical connector disposed at an end thereof for connection to an electrical socket and providing power to the plurality of protruding members;
wherein the frame and the plurality of protruding members comprise a transparent material to enable light emanating from the side-emitting optical fiber to emanate therethrough.

* * * * *